United States Patent
Wise

(12) United States Patent (10) Patent No.: US 8,272,813 B1
(45) Date of Patent: Sep. 25, 2012

(54) COMBINATION POWER TOOL AND OBJECT SENSOR

(76) Inventor: Robert W. Wise, Petaluma, CA (US)

( * ) Notice: Subject to any disclaimer, the term of this patent is extended or adjusted under 35 U.S.C. 154(b) by 1879 days.

(21) Appl. No.: 11/343,642

(22) Filed: Jan. 30, 2006

(51) Int. Cl.
*B23B 45/00* (2006.01)

(52) U.S. Cl. ...................................... 408/16; 408/241 R

(58) Field of Classification Search .................... 408/16, 408/124, 241 R; 173/217
See application file for complete search history.

(56) References Cited

U.S. PATENT DOCUMENTS

| | | | | |
|---|---|---|---|---|
| 1,647,396 A | * | 11/1927 | Decker | 408/241 R |
| 2,513,271 A | * | 7/1950 | Bluemink et al. | 173/170 |
| 3,077,547 A | * | 2/1963 | Metko | 173/217 |
| 3,244,030 A | * | 4/1966 | Godfrey | 173/217 |
| 3,517,574 A | * | 6/1970 | Glatfelter | 74/810.1 |
| 3,696,693 A | * | 10/1972 | Bosten et al. | 81/464 |
| 4,385,276 A | * | 5/1983 | Bitzel | 324/174 |
| 5,170,545 A | * | 12/1992 | Hubscher | 29/26 A |
| 5,562,240 A | * | 10/1996 | Campbell | 227/130 |
| 6,188,228 B1 | * | 2/2001 | Philipp | 324/658 |
| 6,364,580 B1 | | 4/2002 | Dils et al. | |
| 6,536,536 B1 | * | 3/2003 | Gass et al. | 173/2 |
| 6,587,184 B2 | * | 7/2003 | Wursch et al. | 356/4.01 |
| 6,601,478 B1 | * | 8/2003 | Hanson | 81/177.2 |
| 6,851,487 B1 | * | 2/2005 | Shotey | 173/1 |
| 6,878,954 B2 | * | 4/2005 | Butler et al. | 250/559.3 |
| 7,217,069 B2 | * | 5/2007 | Dils et al. | 408/124 |
| 7,357,526 B2 | * | 4/2008 | Zeiler | 362/119 |
| 2001/0053313 A1 | | 12/2001 | Luebke | |
| 2005/0161241 A1 | * | 7/2005 | Frauhammer et al. | 173/1 |
| 2008/0196910 A1 | * | 8/2008 | Radle et al. | 173/20 |

FOREIGN PATENT DOCUMENTS

| | | | |
|---|---|---|---|
| DE | 3138516 A1 | * | 8/1982 |
| DE | 3232740 A1 | * | 3/1984 |
| DE | 3324615 A1 | * | 5/1984 |
| EP | 1036635 A2 | * | 9/2000 |
| EP | 1 595 654 A1 | | 11/2005 |
| GB | 2203363 A | * | 10/1988 |
| GB | 2366753 A | * | 3/2002 |
| WO | WO 9852723 A1 | * | 11/1998 |

OTHER PUBLICATIONS

EPO website translation of EP 1036635 A2, two pages, printed Sep. 22, 2008.*
Manual translation of EP 1,036,635, translated Jun. 2009 by The McElroy Translation Company.*

* cited by examiner

*Primary Examiner* — Daniel Howell
(74) *Attorney, Agent, or Firm* — Lowe Graham Jones PLLC

(57) ABSTRACT

A combination power tool and object sensor includes a power tool body having a handle with a free end. An object sensor, such as a stud finder is located at the free end. The object sensor is oriented with respect to the free end of the handle such that a user may use both the object sensor, and the power tool without repositioning his or her hand with respect to the power tool handle. The object sensor is nonremovable.

10 Claims, 3 Drawing Sheets

COMBINATION POWER TOOL AND OBJECT SENSOR

TECHNICAL FIELD

The invention relates to hand tools and devices for sensing objects. More specifically, the invention relates to a combination handheld tool and object sensor.

BACKGROUND OF THE INVENTION

The construction industry in the United States, particularly the residential construction industry has changed dramatically over the last few decades. There was once a time when it was said that labor was cheap, and materials were expensive. It has recently become axiomatic that labor is expensive and materials are cheap. Therefore, a wide variety of labor saving tools and devices have become available to the construction industry. The inventor herein is also the inventor of a variety of labor saving devices directed to the construction trades including U.S. Pat. No. 6,708,461 titled "Pinch Clamp" issued Mar. 23, 2004; U.S. Pat. No. 6,715,374 titled "Cabinet and Mill Work Finish Bar" issued Apr. 4, 2004 and pending U.S. patent application Ser. No. 11/013,129 titled "Repetitive Fence for Cross Cutting Materials" filed Dec. 15, 2004. The disclosure of those patents/applications are incorporated herein by reference.

Particularly with respect to the installation of drywall in residential construction, it has been recognized that there is a need to facilitate the installation of drywall on vertical framing studs. Today, drywall is physically connected to studs by the use of drywall screws, with electric drills/screwdrivers rather than with nails. That is, the drywall installer typically positions a sheet of drywall (i.e. sheet rock) against the internal surface of framing studs. The installer may then locate the studs behind the drywall using a variety of techniques including prescribed measurements or a so-called "stud finder" tool. Stud finder tools comprise of a wide variety of devices but are typically of the sonic variety defined by a handheld device having a planar surface for sliding over the surface of the drywall. A sonic sensor indicates the existence of a stud behind the drywall by actuating an indicator (either visual or audible or both). The drywall installer may then mark this position, or promptly drill a hole with an electric drill, position a drywall screw in the resulting countersunk hole, and drive the screw home with the same drill. The predrilling step may be eliminated if the electric drill is of the type having a clutch allowing the screw head to be set flush with the drywall surface. Finally, in a process called taping and mudding, the drywall screw head is concealed as are joints between drywall sections. The rechargeable electric drill has become a favorite tool amongst drywall installers. Almost invariably, a rechargeable battery pack is either concealed within or connected to a handle of the portable electric drill.

In order to facilitate rapid location of studs behind drywall, and subsequent installation of drywall screws, various prior art devices have been conceived which incorporate a stud finding device, or other object sensor into the body of the electric drill. U.S. Patent Application No. U.S. 2001/0053313A1 published on Dec. 20, 2001 titled "Hand Drill Attachment" discloses a subsurface object locator which is removably attached to the top of a battery powered electric drill. The removable subsurface object locator is readily detached from the drill for application against a surface to detect a subsurface object, such as a framing stud. The use of the device described in this published application requires a series of steps by the user to remove the subsurface object locator from the drill, position the object locator against the wall, mark the location of the stud, reattach the subsurface object locator to the drill and use the drill to install the drywall screw into the wall. While such a device no longer requires that a drywall installer carry a separate stud finder in a pocket, use of this device remains cumbersome.

Published European Patent Application EP1,595654A1 titled "Handheld Tool with Removable Object Sensor" filed on Apr. 27, 2005 and claiming a priority from U.S. application Ser. No. 09/933,177 filed Nov. 16, 2001 having the same title attempts to remedy the shortcomings of the aforementioned '313 published U.S. Patent Application. In the European Patent Application, a battery powered electric drill includes a removable object sensor, such as a stud locator in a variety of positions with respect to the drill for easy removal thereof. Nevertheless, the device disclosed in the European Patent Application still requires that the user employ a multi-step process for removing the object sensor from the tool, using the object sensor, and then returning the object sensor to the tool prior to subsequent operation of the electric drill for placement of a drywall screw through drywall into a stud. It is difficult to conceive that a user might use the device disclosed in the European Patent Application without using two hands, or removing his or her hand from an operating position of the drill.

Therefore, a need exists for a combination power tool and object sensor which permits a user to locate an object, such as a framing stud beneath a sheet of drywall without removing the object sensor from the power tool.

A further need exists, for a combination power tool and object sensor in which the object sensor can be operated without the requirement of the user removing his or her hand from a power tool operating position.

SUMMARY OF THE INVENTION

It is therefore an object of the present invention to provide a combination power tool and object sensor which does not require removal of the object sensor from the power tool for operation.

It is yet another object of the present invention, to achieve the above object with a combination power tool and object sensor which does not require the user to change his or her hand from an operating position of the power tool, to an operating position of the object sensor.

These objects, and other objects and of the invention are achieved by providing a combination power tool and object sensor in which the object sensor is located at a free end of the power tool handle.

In a preferred embodiment of the invention, the object sensor is nonremovable and has an operably coupled object sensor indicator for indicating the detection of the desired object. An external power cord, in the form of electrical cable, air hose or the like, interconnects a prime mover (e.g. an electrical motor) with an external power supply (e.g. a battery pack) such that the free end of the power tool handle is available for placement of the object sensor.

In other embodiments of the invention, the indicator for the object sensor may be of the audible type, the power tool may be an electric drill or saber saw, circular saw or the like. In addition, the object sensor may be adapted for indicating the position of objects other than framing studs.

DETAILED DESCRIPTION OF THE PREFERRED EMBODIMENTS

Figure 1:
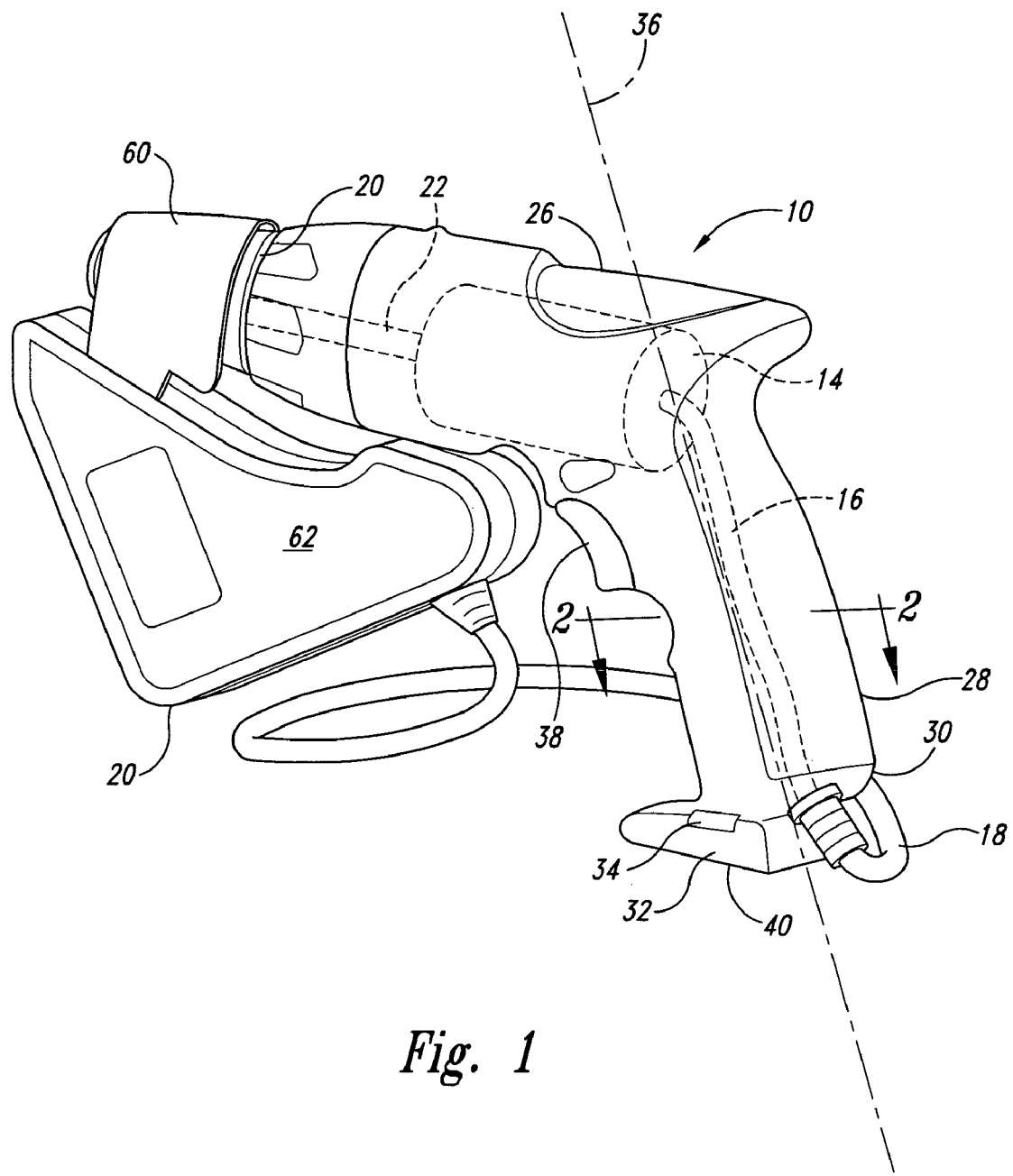
FIG. 1 is a perspective, environmental view of a combination power tool and object sensor of the electric drill type including an external battery pack interconnected with the power tool by a power cord.
Figure 2:
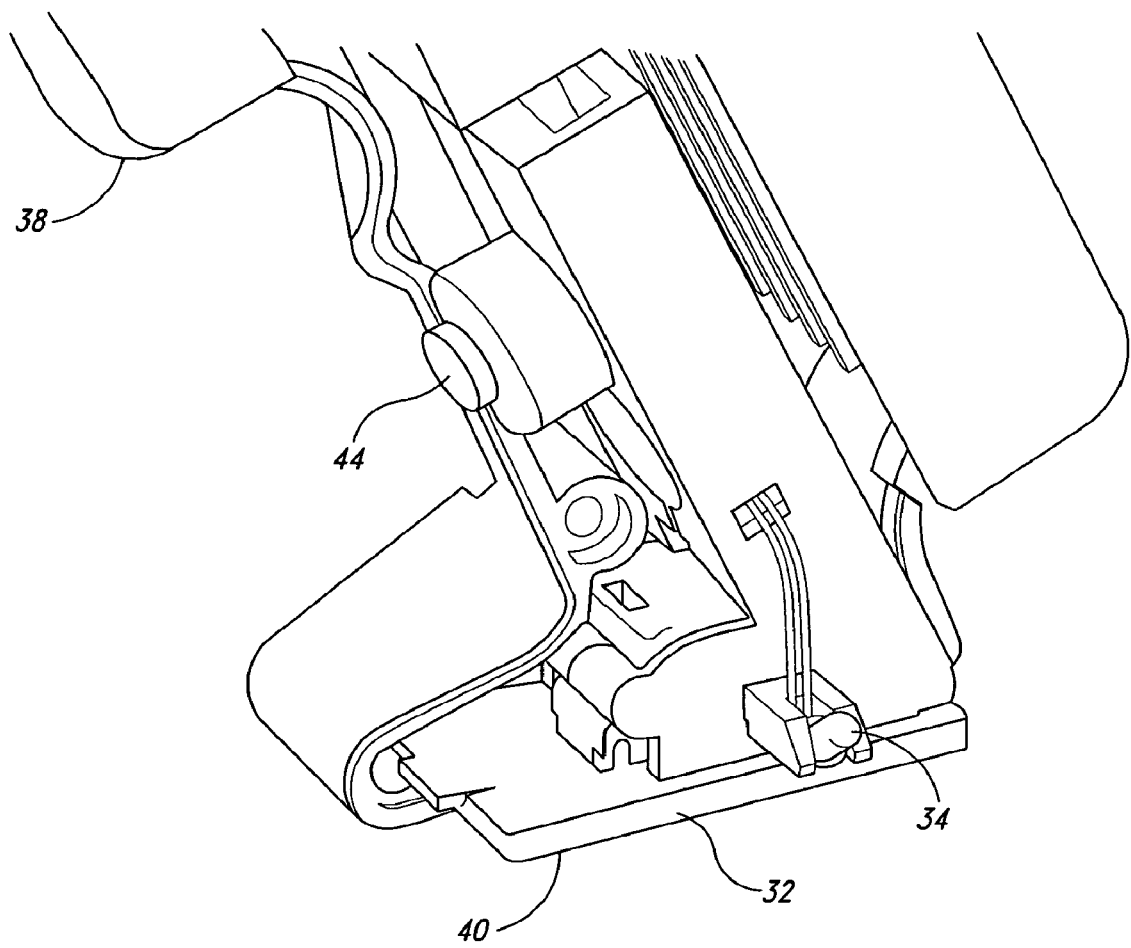
FIG. 2 is a perspective, partial sectional view taken along line 2-2 of FIG. 1 illustrating the object sensor in detail.

A combination power tool and object sensor in accordance with the principles of the invention is generally indicated at reference numeral 10 in the various Figures. In this preferred embodiment, the power tool is of the electric drill type. Nevertheless, a wide variety of power tools including saber saws, circular saws, and the like are amenable to adaptation to the present invention. In the preferred embodiment shown in the Figures, the power tool 10 includes a prime mover 14 in the form of an electrical motor of the direct current type having an internal power cord 16 connected to an external power cord 18, and an external, rechargeable battery pack 20. The power tool 10 then further has a drive shaft 22 connected to a chuck 20 for driving a working member, such as a drill bit, screwdriver bit or the like shown at reference numeral 24 in FIG. 3.

The combination power tool and object sensor 10 has a housing or body 26 including a handle 28 adapted for grasping by a user's hand for operation of the power tool. The handle has a free end 30 at which is located an object sensor 32, such as a conventional stud sensor. The object sensor includes an indicator, such as a visual indicator 34 in the form of a light emitting diode (LED) for indicating presence of the object to be located, such as a framing stud.

The object sensor 32 is positioned at the free end 30 of the handle 28 substantially transverse to a major axis 36 defined by the handle 28. This orientation advantageously allows a user to position his or her hand on the handle 28 so as to operate a trigger 38 of the power tool 10 while simultaneously being able to position a substantially planar operating surface 40 of the object sensor 32 against a drywall surface without repositioning the user's hand. An object sensor operating button 44 is advantageously positioned on the handle, in the vicinity of the power tool trigger 38 such that the object sensor may be operated without repositioning of the user's hand, while the visual indicator 34 is also positioned so as to be visible to the user without repositioning the user's hand.

Figure 3:
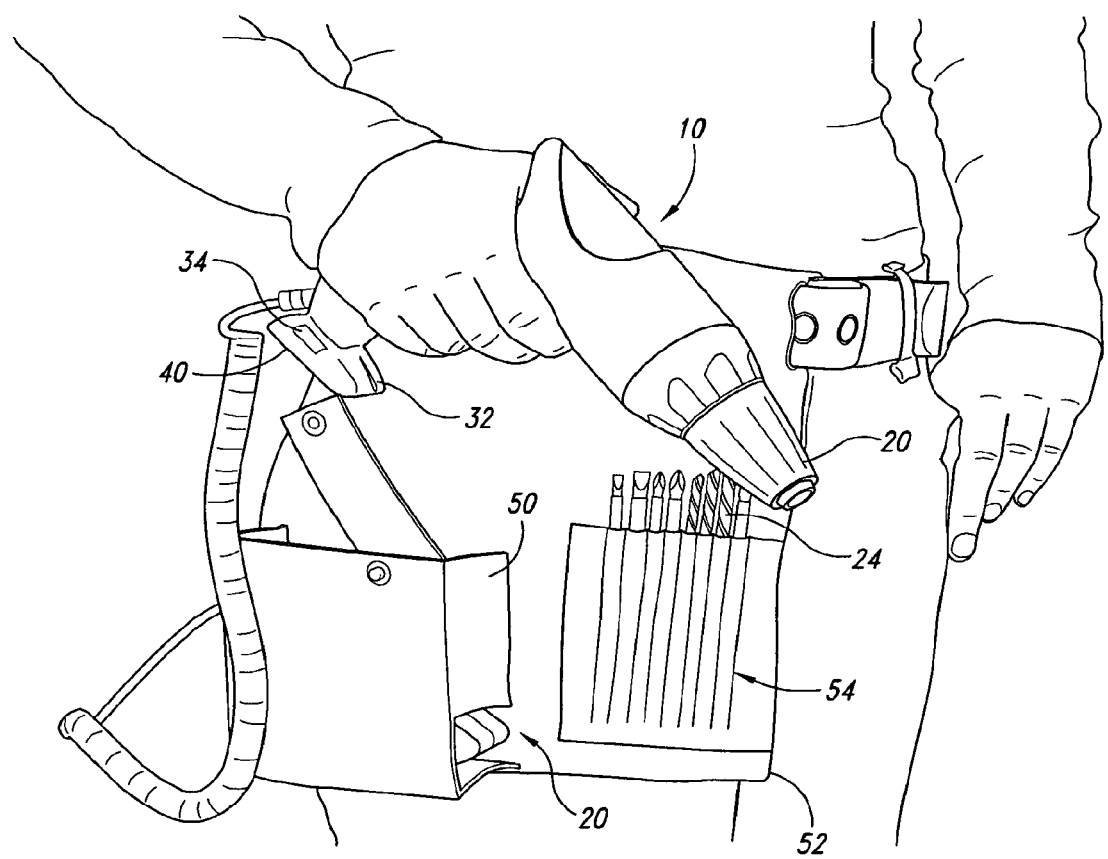
FIG. 3 is an environmental view, showing the combination power tool and object sensor in use with a hip belt/battery pack combination.

It will be apparent to those of ordinary skill in the art that by positioning the battery pack 20 external to the power tool body 26, a synergism results in that the object sensor 32 being positioned at the free end 30 at the handle 28 such that in normal operation, the drywall installer can advantageously hold a drywall sheet (not shown) in position against the framing studs, use the object sensor 32 to determine the position of the now hidden stud by way of the visual indicator 34, position a drywall screw in place at the location of the hidden stud, and drive the drywall screw into the drywall (not shown) in one substantially continuous operation without repositioning the user's hand with respect to the power tool body 26 or handle 28. Furthermore, by removing the rechargeable battery pack 20 from its conventional position at the free end 30 of handle 28, the battery pack 20 can now be positioned in a holster 50 best seen in FIG. 3 about the user's waist in a fashion similar to a carpenter's apron 52. The apron 52 may include receptacles 54 for the screwdriver bits and drill bits 24 as shown in FIG. 3. The battery pack 20 is preferably provided with a hoop 60 and a substantially triangular outer case 62 for receiving the power tool body 10. The holster 50 thus not only secures the battery pack 20 to the apron 52, but also provides a convenient place to hold the power tool 10 on the user's hip. A strap having a snap may also be provided on the holster to secure the power tool within the holster.

Those of ordinary skill in the art will conceive of other alternate embodiments of the invention upon reviewing this disclosure. Thus, the invention is not to be limited to the above description, but is to be determined in scope by the claims which follow.

I claim:

1. An improved power tool, comprising:
   a power tool body having a rearwardly disposed handle for grasping by a user's hand and a prime mover for operating a working member, the power tool handle having an exposed free end;
   a non-removable object sensor integral with the handle and located at the free end for positioning against an object to be sensed such that a user can position the object sensor against the object to be sensed without repositioning the user's hand with respect to the handle;
   indicator means operatively coupled with the object sensor for indicating the detection of the object; and;
   an external power cord connected to the power tool body at a first end thereof displaced from the object sensor for powering the prime mover.

2. The improved power tool of claim 1, wherein the object sensor is a stud finder.

3. The improved power tool of claim 2, wherein the indicator means is a visual indicator.

4. The improved power tool of claim 3, wherein the visual indicator is a light emitting diode.

5. The improved power tool of claim 2, wherein the indicator means is an audible indicator.

6. The improved power tool of claim 1, wherein the power cable has a second end connected to a battery pack external to and separate from the power tool.

7. The improved power tool of claim 6, wherein the battery pack is rechargeable.

8. The improved power tool of claim 1, wherein the power tool is an electric drill and the working member is a drill chuck.

9. The improved power tool of claim 8, wherein the object sensor is a stud finder and the indicator means includes a light for indicating the presence of a stud, wherein the stud finder has a planar base substantially perpendicular to a major axis of the handle for positioning the base against a wall, and an actuating button positioned on the handle whereby the user's hand need not be repositioned on the handle to operate the stud finder.

10. The improved power tool of claim 1, wherein the handle includes an actuating button operatively connected to the object sensor.

* * * * *